(12) United States Patent
Fukuzawa

(10) Patent No.: US 10,749,406 B2
(45) Date of Patent: Aug. 18, 2020

(54) BLOWER DEVICE

(71) Applicant: SHINANO KENSHI CO., LTD., Ueda-shi, Nagano (JP)

(72) Inventor: Akihito Fukuzawa, Nagano (JP)

(73) Assignee: SHINANO KENSHI CO., LTD., Ueda-shi (JP)

( * ) Notice: Subject to any disclaimer, the term of this patent is extended or adjusted under 35 U.S.C. 154(b) by 95 days.

(21) Appl. No.: 16/103,110

(22) Filed: Aug. 14, 2018

(65) Prior Publication Data

US 2019/0081535 A1  Mar. 14, 2019

(30) Foreign Application Priority Data

Sep. 13, 2017  (JP) ................................ 2017-176208

(51) Int. Cl.
*H02K 5/22* (2006.01)
*H02K 7/14* (2006.01)
(Continued)

(52) U.S. Cl.
CPC ......... *H02K 5/225* (2013.01); *F04D 25/0613* (2013.01); *F04D 25/0693* (2013.01);
(Continued)

(58) Field of Classification Search
CPC . H02K 7/14; H02K 11/33; H02K 5/10; H02K 5/225; H02K 1/2786; H02K 3/345; H02K 5/161; H02K 5/24; H02K 5/22; F04D 25/0613; F04D 25/0646; F04D 25/0693; F04D 29/083
USPC .......................................................... 310/71
See application file for complete search history.

(56) References Cited

U.S. PATENT DOCUMENTS 7,211,914 B2 * 5/2007 Hofmann ................. H02K 5/10
310/68 R
8,113,800 B2 * 2/2012 Koitabashi ............ F04C 23/008
174/152 G
(Continued)

FOREIGN PATENT DOCUMENTS

EP       1 077 333 A2     2/2001
JP       2002-252958 A    9/2002
WO   WO 2017129899 A1 *  8/2017

OTHER PUBLICATIONS

English machine translation, Le Goff et al. WO 2017129899 (Year: 2017).*

(Continued)

*Primary Examiner* — Burton S Mullins
(74) *Attorney, Agent, or Firm* — Oliff PLC

(57) ABSTRACT

A blower device includes: a fan; a motor rotating the fan; a cover covering a stator and a coil of the motor; a terminal electrically connected to the coil and protruding from the cover; a printed circuit board electrically connected to the terminal; a housing including a receiving hole receiving the terminal and supporting the stator; and an elastic body sandwiched between the cover and the housing and formed into an annular shape, wherein the elastic body includes a first seal portion surrounding the terminal within the receiving hole, the cover includes a protruding portion, a protruding height of the protruding portion from the cover is lower than that of the terminal from the cover, and the protruding portion supports the first seal portion.

2 Claims, 5 Drawing Sheets

(51) Int. Cl.
  *H02K 11/33* (2016.01)
  *F04D 29/08* (2006.01)
  *F04D 25/06* (2006.01)
  *H02K 5/10* (2006.01)
  H02K 5/16 (2006.01)
  H02K 5/24 (2006.01)
  H02K 1/27 (2006.01)
  H02K 3/34 (2006.01)

(52) U.S. Cl.
  CPC ............ *F04D 29/083* (2013.01); *H02K 5/10* (2013.01); *H02K 7/14* (2013.01); *H02K 11/33* (2016.01); *H02K 1/2786* (2013.01); *H02K 3/345* (2013.01); *H02K 5/161* (2013.01); *H02K 5/24* (2013.01)

(56) References Cited

U.S. PATENT DOCUMENTS

| | | | | |
|---|---|---|---|---|
| 8,400,031 | B2 * | 3/2013 | Bitzer | H01R 13/5205 310/71 |
| 8,415,846 | B2 * | 4/2013 | Best | H02K 5/10 310/43 |
| 8,461,734 | B2 * | 6/2013 | Sahara | H02K 3/522 310/194 |
| 2002/0117914 | A1 | 8/2002 | Doi et al. | |
| 2007/0001529 | A1 * | 1/2007 | Takahashi | H02K 5/10 310/88 |

OTHER PUBLICATIONS

Jan. 17, 2019 Extended Search Report issued in European Patent Application No. 18190535.7.

\* cited by examiner

BLOWER DEVICE

CROSS-REFERENCE TO RELATED APPLICATION

This application is based upon and claims the benefit of priority of the prior Japanese Patent Application No. 2017-176208, filed on Sep. 13, 2017, the entire contents of which are incorporated herein by reference.

BACKGROUND

(i) Technical Field

The present invention relates to a blower device.

(ii) Related Art

In a motor disclosed in Japanese Unexamined Patent Application Publication No. 2002-252958, a coil of the motor is connected to a printed circuit board via a connecting terminal. The connecting terminal penetrates through a hole of a casing, and a seal member made of a rubber is interposed between the connecting terminal and the hole.

SUMMARY

According to an aspect of the present invention, there is provided a blower device including: a fan; a motor rotating the fan; a cover covering a stator and a coil of the motor; a terminal electrically connected to the coil and protruding from the cover; a printed circuit board electrically connected to the terminal; a housing including a receiving hole receiving the terminal and supporting the stator; and an elastic body sandwiched between the cover and the housing and formed into an annular shape, wherein the elastic body includes a first seal portion surrounding the terminal within the receiving hole, the cover includes a protruding portion, a protruding height of the protruding portion from the cover is lower than that of the terminal from the cover, and the protruding portion supports the first seal portion.

DETAILED DESCRIPTION

Figure 1:
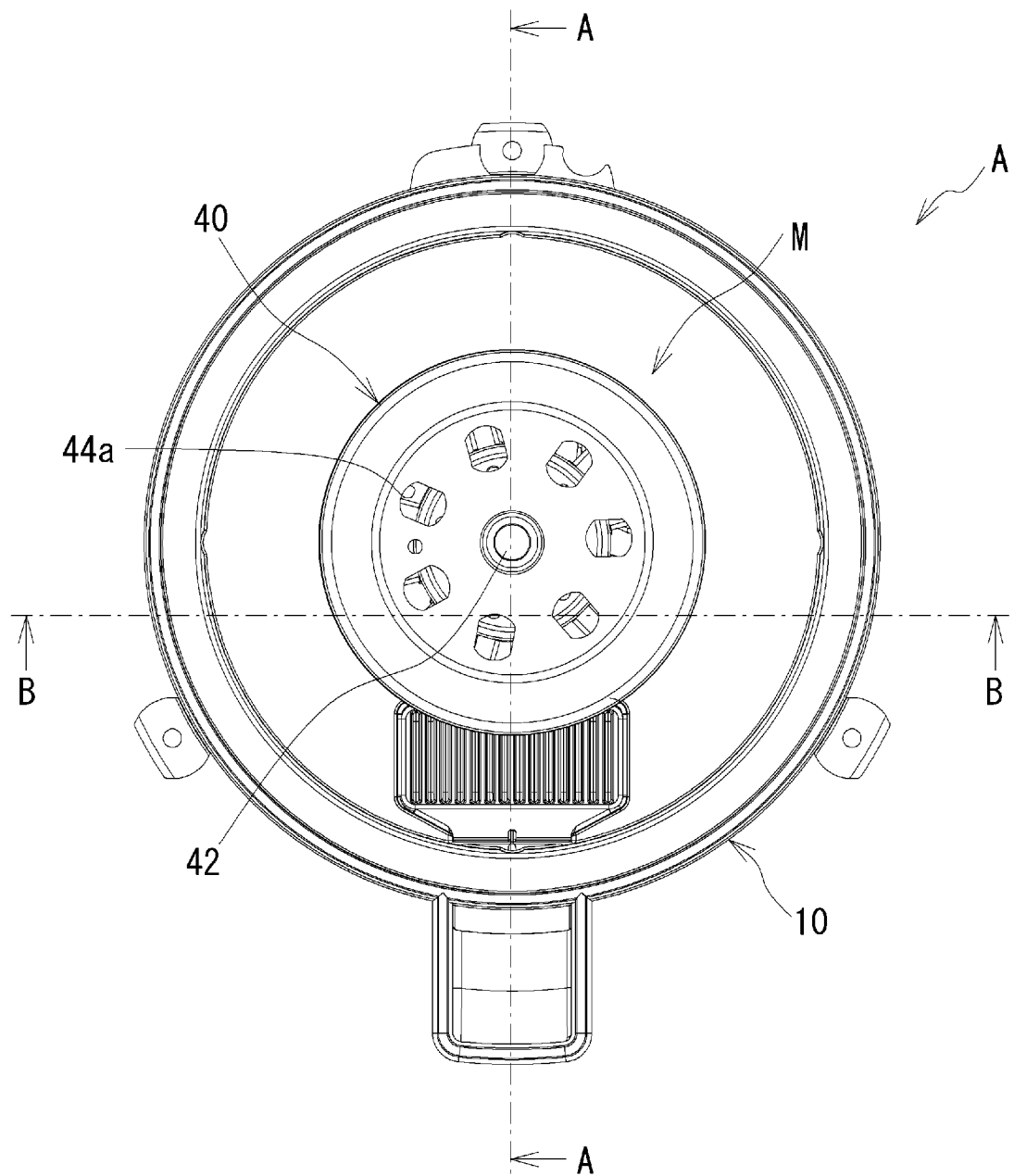
FIG. 1 is an external view of a blower device according to the present embodiment.
Figure 2A:
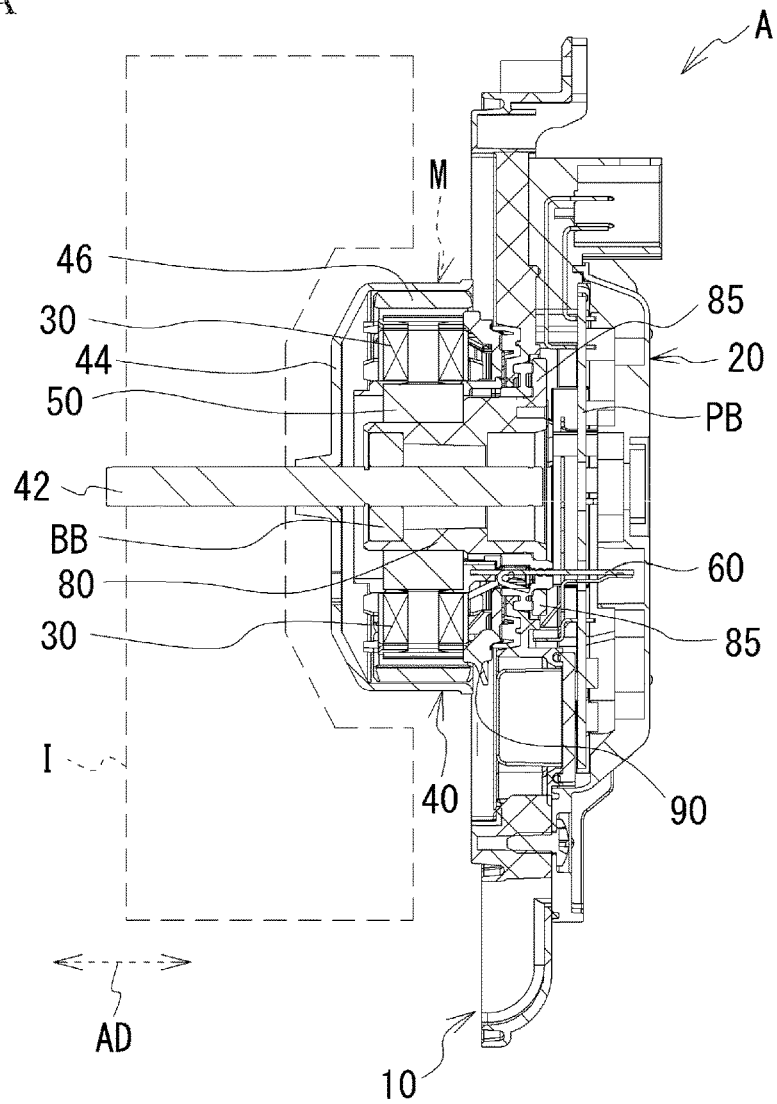
FIG. 2A is a cross-sectional view taken along line A-A of FIG. 1.
Figure 2B:
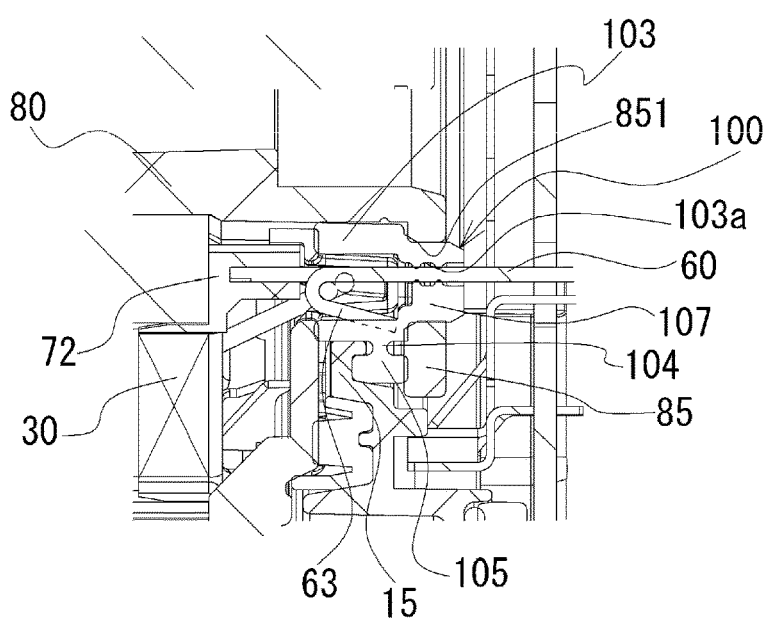
FIG. 2B is an enlarged view of FIG. 2A.
Figure 3A:
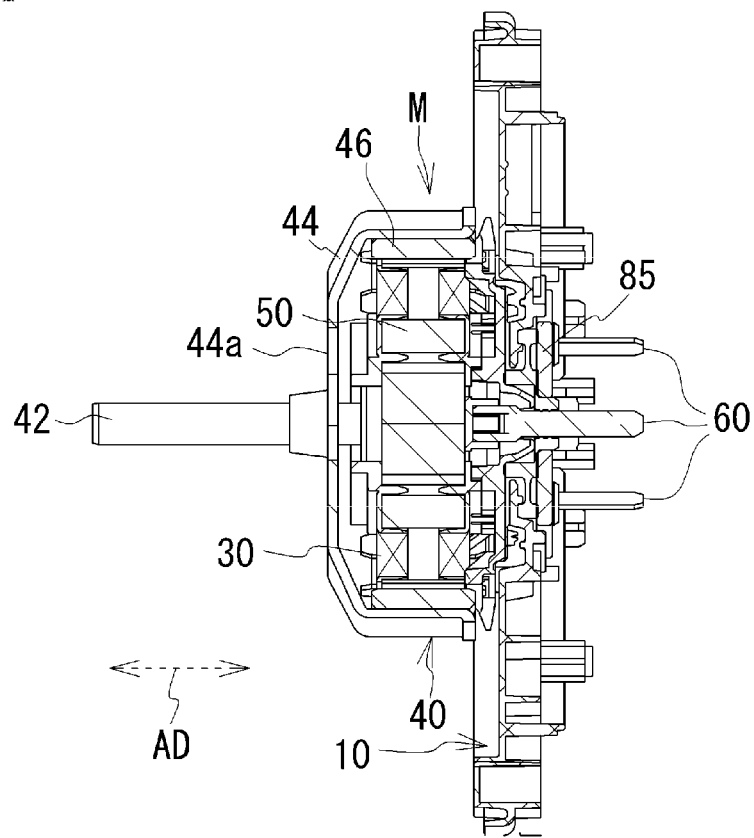
FIG. 3A is a cross-sectional view taken along line B-B of FIG. 1.
Figure 3B:
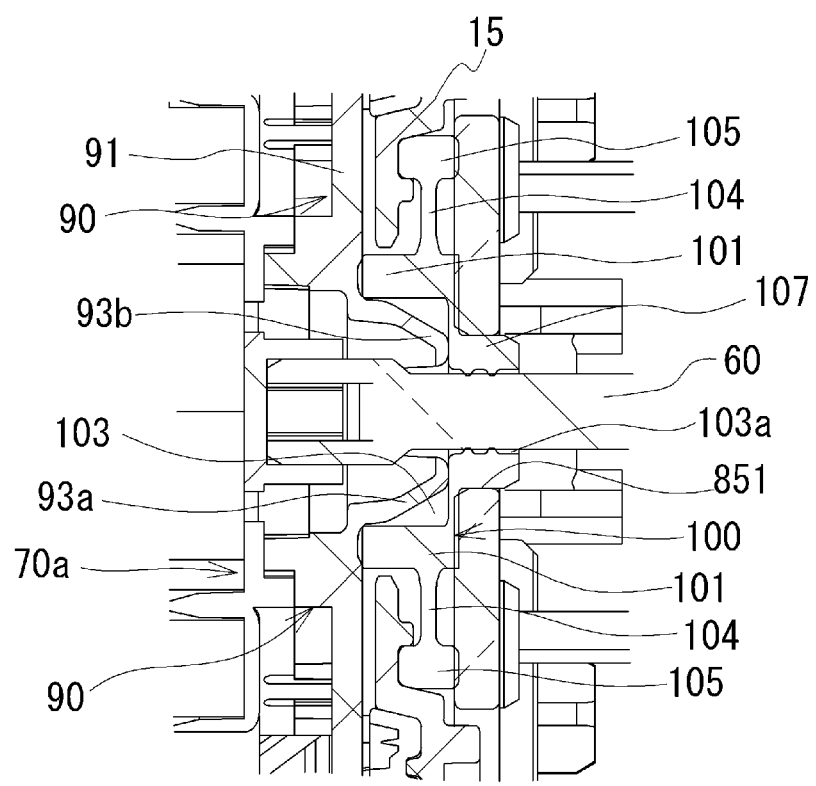
FIG. 3B is an enlarged view of FIG. 3A.

FIG. 1 is an external view of a blower device A according to the present embodiment. FIG. 2A is a cross-sectional view taken along line A-A of FIG. 1. FIG. 2B is an enlarged view of FIG. 2A. FIG. 3A is a cross-sectional view taken along line B-B of FIG. 1. FIG. 3B is an enlarged view of FIG. 3A. Additionally, in FIG. 3A, a case 20, and parts arranged near the case 20 are omitted. The blower device A includes cases 10 and 20, a motor M, a fan I rotated by the motor M, a printed circuit board PB electrically connected to the motor M, and the like. Additionally, the fan I is illustrated only in FIG. 2A, and is omitted in the other drawings. The motor M and the fan I are positioned on one side with respect to the case 10. A case 20 is attached to the other side of the case 10. The cases 10 and 20, each formed into a semi-casing shape, are assembled into each other to house the printed circuit board PB. The cases 10 and 20 are made of, but not limited to, a synthetic resin, and may be made of a metal. Additionally, the case 10 exposes a heat sink 200 made of a metal and thermally connected to the printed circuit board PB. The heat sink 200 faces the fan I. The heat dissipation of the heat sink 200 is promoted by the rotation of the fan I, thereby ensuring the cooling property of the printed board PB.

The motor M will be described. As illustrated in FIG. 2A, the motor M is positioned between the fan I and the case 10. The motor M includes coils 30, a rotor 40, a stator 50, a housing 80, a cover 90, and the like. The stator 50, made of a metal, will be described later in detail. The coils 30 are wound around respective teeth portions of the stator 50. The coils 30 are electrically connected to the printed circuit board PB via terminals 60 which are not electrically connected to and is supported by the stator 50. Parts for controlling the energization states of the coils 30 are mounted on the printed circuit board PB. The cover 90 will be described later.

The rotor 40 includes a rotational shaft 42, a yoke 44, and one or more permanent magnets 46. The rotational shaft 42, penetrating through the housing 80, is rotatably supported. Specifically, the rotational shaft 42 is rotatably supported by a bearing B held in the housing 80. The yoke 44, made of a metal having a substantially cylindrical shape, is fixed to the rotational shaft 42 outside the housing 80. The housing 80 includes a flange portion 85 having a disk shape, having an outer diameter larger than that of a cylindrical portion, and positioned at an end portion of the cylindrical portion near the printed circuit board PB. The flange portion 85 is formed with receiving holes through which the respective terminals 60 penetrate, as will be described later in detail. One or more permanent magnets 46 are fixed to an inner circumferential surface of the yoke 44. Additionally, the yoke 44 is provided with vent holes 44a around the rotational shaft 42, thereby promoting heat dissipation of the motor M. The permanent magnets 46 face an outer side of the teeth portions of the stator 50. When the coils 30 are energized to excite the teeth portions of the stator 50, the magnetic attractive force and the magnetic repulsive force are exerted between the permanent magnets 46 and the teeth portions, whereby the yoke 44, that is, the rotor 40 rotates relative to the stator 50. In such a manner, the motor M is an outer rotor type motor in which the rotor 40 rotates.

Figure 4A:
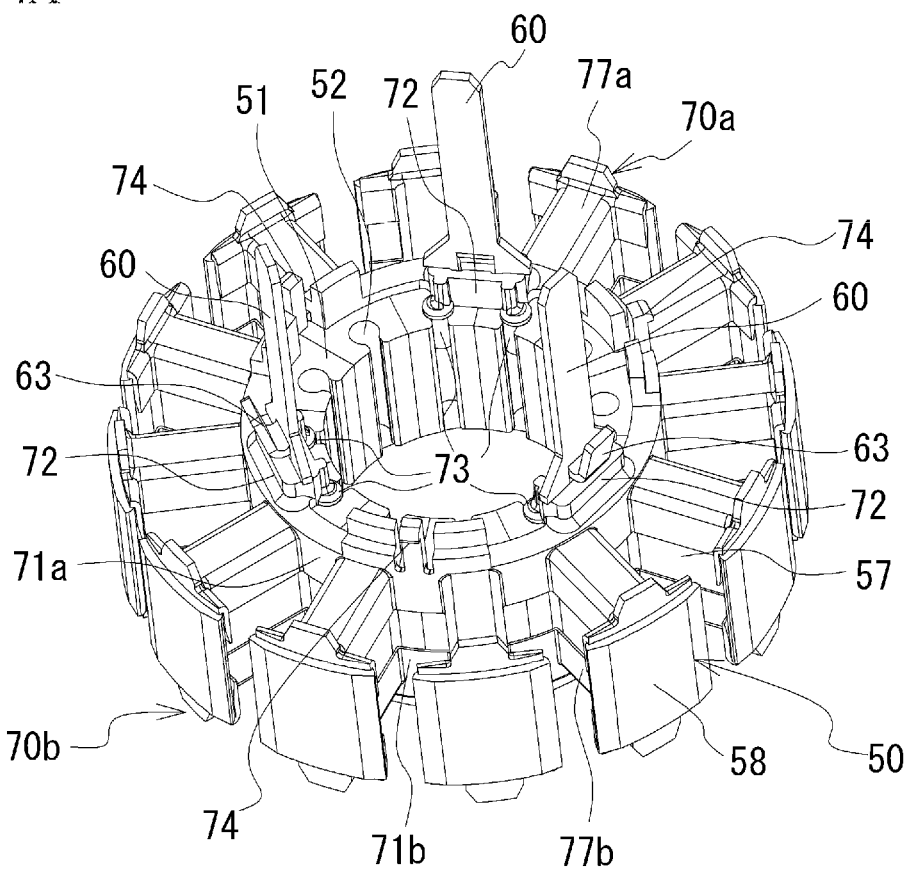
FIG. 4A is an explanatory view of a stator.

Next, a description will be given of the stator 50 and the cover 90. FIG. 4A is the stator 50. FIG. 4A illustrates the stator 50 into which insulators 70a and 70b are assembled. The three terminals 60 are assembled into the insulator 70a. The stator 50 includes an annular portion 51, teeth portions 57, and magnetic pole portions 58. The teeth portions 57 extend radially outward from the annular portion 51. The magnetic pole portions 58, formed at respective ends of the teeth portions 57, face the above-described permanent magnets 46. Grooves 52 are provided in the inner circumference of the annular portion 51.

Each of the insulators 70a and 70b is made of a synthetic resin having insulating property. The insulator 70a is assembled into the stator 50 near the case 10. The insulator 70b is assembled into the stator 50 near the fan I. The insulator 70a includes an annular covering portion 71a and teeth covering portions 77a. The annular covering portion 71a is formed into a substantially annular shape so as to cover an outer circumferential side of an end portion, in the axial direction AD, of the annular portion 51 of the stator 50 and to cover a part of an outer circumferential surface of the annular portion 51. The teeth covering portions 77a, extending radially outward from the annular covering portion 71a, cover respective sides of the teeth portions 57 of the stator 50. As illustrated in FIG. 4A, the insulator 70b also includes an annular covering portion 71b and teeth covering portions 77b. Additionally, the insulators 70a and 70b expose the magnetic pole portions 58. Although not illustrated in FIG. 3, the coils 30 described above are wound around the respective teeth portions 57 of the stator 50 via the teeth covering portions 77a and 77b.

As illustrated in FIG. 4A, the annular covering portion 71a is provided with holding portions 72. The terminals 60 are held by the respective holding portions 72. Each holding portion 72 is provided with two engaging pins 73. The engaging pin 73 is fitted into the groove 52. As illustrated in FIG. 4A, the terminal 60 is formed with a bent portion 63 which is partially cut out and bent radially outward. A part of the coil 30 is pulled out and hooked to the bent portion 63. Thus, the coil 30 and the terminal 60 are electrically connected to each other. As illustrated in FIG. 2A, a distal end of the terminal 60 is electrically connected to the printed circuit board PB via a metal member.

As illustrated in FIG. 4A, the annular covering portion 71a is provided with three snap-fit claws 74 at substantially equal angular intervals. The snap-fit claw 74 is provided between the holding portions 72. The snap-fit claw 74 is engaged with the cover 90 described later, which fixes the cover 90 to the insulator 70a.

Figure 4B:
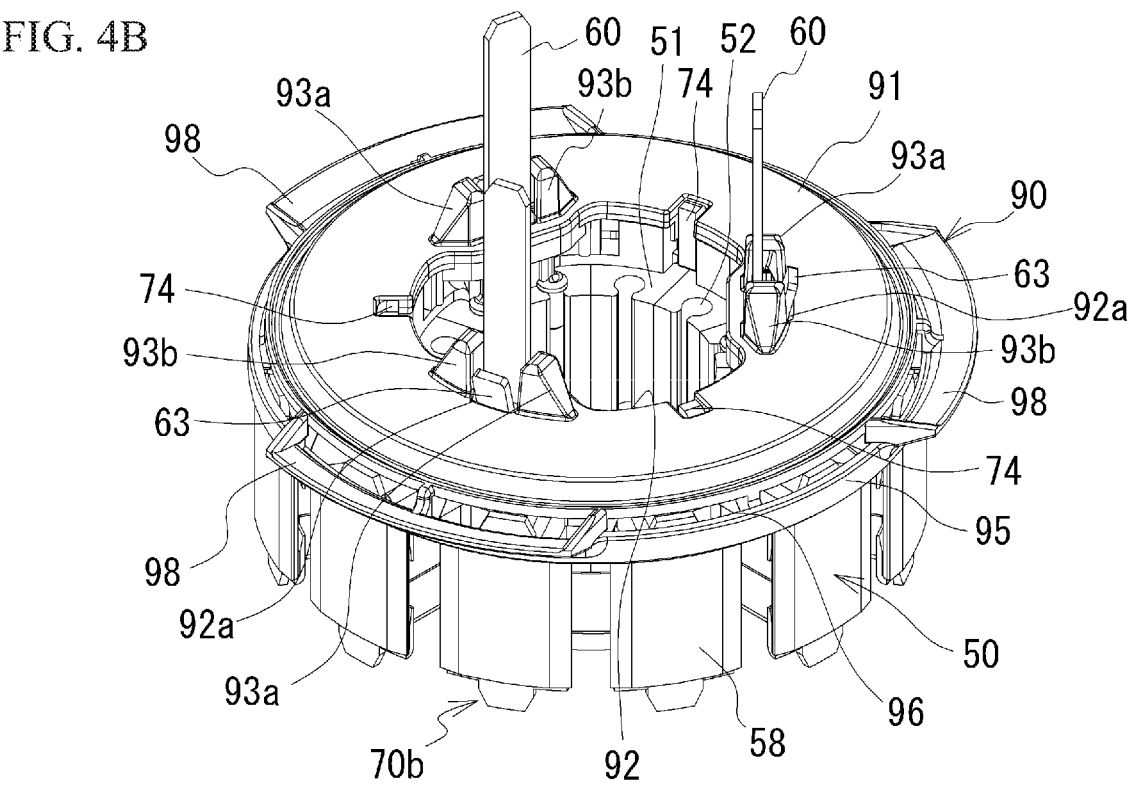
FIG. 4B is a view illustrating the stator to which a cover is attached.

FIG. 4B is a view illustrating the stator 50 to which the cover 90 is attached. The cover 90, made of a synthetic resin, includes a disk portion 91, a cylindrical portion 95, and blade portions 98. The disk portion 91 has a substantially disc shape having an opening portion 92 in the center. Further, the snap-fit claws 74 are engaged with the disk portion 91 in the vicinity of the opening portion 92. The cylindrical portion 95 is provided near the outer peripheral edge of the disk portion 91. The blade portions 98 are provided in the cylindrical portion 95 and protrude radially outward. A vent hole 96 is formed on the outer periphery of the cylindrical portion 95, which ensure air permeability.

Through holes 92a from which the respective terminals 60 protrudes are formed around the opening portion 92. A part of the bent portion 63 also protrudes together with the terminal 60 from the through hole 92a. Protruding portions 93a and 93b are formed in the disk portion 91 in the vicinity of the through hole 92a. The protruding portions 93a and 93b are positioned to sandwich the terminal 60 in the width direction thereof. The protruding height of each of the protruding portions 93a and 93b from the disc portion 91 is lower than that of the terminal 60 therefrom.

Figure 5A:
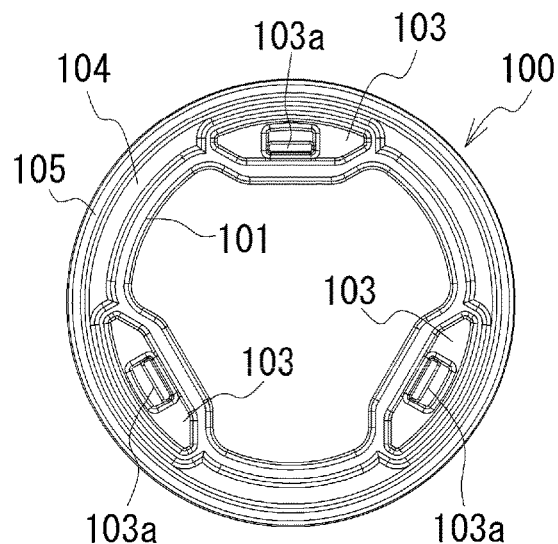
FIGS. 5A to 5D are external views of a rubber member.
Figure 5B:
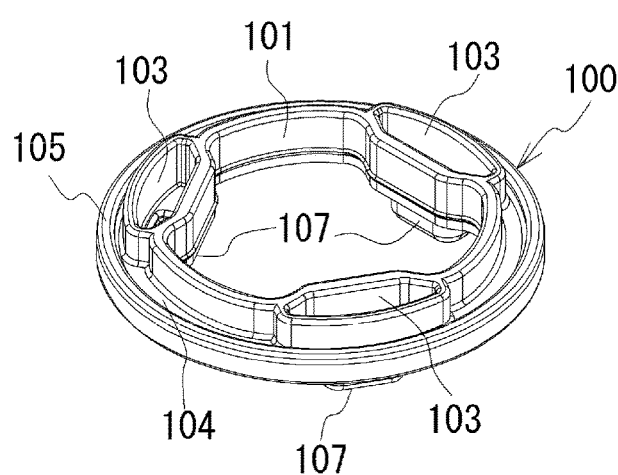
Figure 5C:
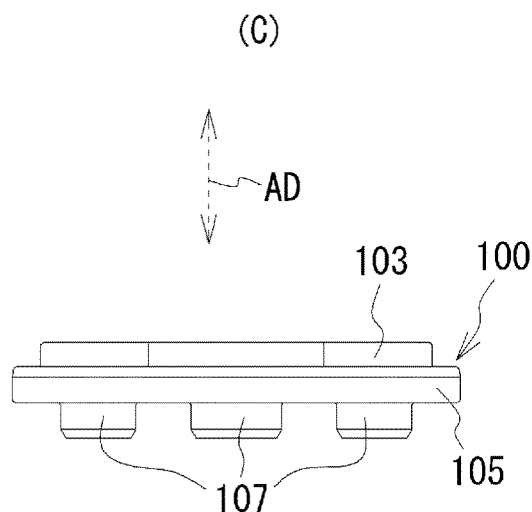
Figure 5D:
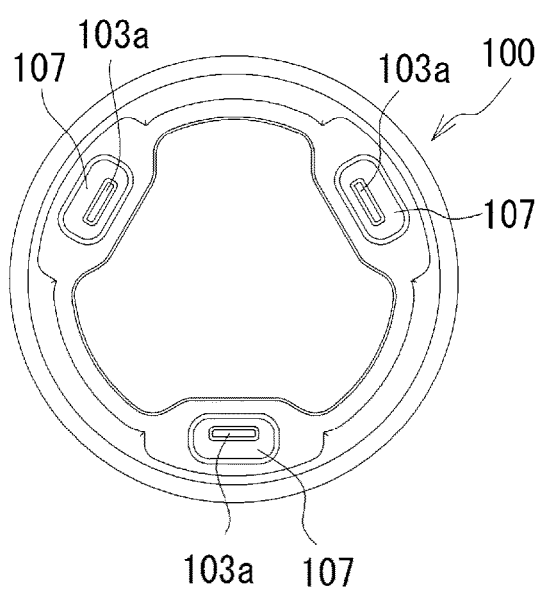

Next, a rubber member 100 will be described with reference to FIGS. 2B, 3B, and 5A to 5D. FIGS. 5A to 5D are external views of the rubber member 100. FIG. 5A is a view of the rubber member 100 when viewed from its side attached to the cover 90. FIG. 5D is a view of the rubber member 100 when viewed from the opposite side. The rubber member 100 is formed into a substantially annular shape. The rubber member 100 is an example of an elastic body. The rubber member 100 includes an inner circumferential wall portion 101, a connection portion 104, an outer circumferential wall portion 105, seal portions 103, and seal portions 107. The outer circumferential wall portion 105, defining the outer circumferential portion of the rubber member 100, has a substantially cylindrical shape. The inner circumferential wall portion 101 defines the inner circumferential portion of the rubber member 100. The connecting portion 104, connecting the inner circumferential wall portion 101 and the outer circumferential wall portion 105, is arranged therebetween. A thickness of the connecting portion 104 in the axial direction AD is thinner than that of each of the inner circumferential wall portion 101 and the outer circumferential wall portion 105. The three seal portions 103 are formed continuously with the inner circumferential wall portion 101 at equal angular intervals. As illustrated in FIG. 5A, the seal portion 103 has a long groove shape whose longitudinal direction is the tangential direction of the rubber member 100 in the circumferential direction. The seal portion 103 is formed with a through hole 103a, having a slit shape, through which the terminal 60 penetrates.

The seal portion 107, formed continuously from the seal portion 103 in the axial direction AD, protrudes toward the side opposite to the side of the rubber member 100 attached to the cover 90. As illustrated in FIG. 5D, the seal portion 103 has a shape whose longitudinal direction is the tangential direction of the rubber member 100 in the circumferential direction. The through hole 103a also penetrates through the seal portion 107. Accordingly, as illustrated in FIG. 3B, the seal portions 103 and 107 are aligned in the axial direction AD, in other words, in the direction in which the terminal 60 extends. A length of the seal portion 107 in the circumferential direction of the rubber member 100 is smaller than that of the seal portion 103. Therefore, as illustrated in FIG. 3B, the seal portions 103 and 107 as a whole are formed into a tubular shape including a step portion. The seal portion 107 corresponds to a first seal portion. The seal portion 103 corresponds to a second seal portion.

The rubber member 100 is attached to the cover 90 such that the terminal 60 penetrates through the through hole 103a and that the protruding portions 93a and 93b adjacent to the terminal 60 are surrounded by the seal portion 103. In this state, the rubber member 100 is attached to the housing 80 such that the seal portion 107 penetrates through a receiving hole 851 of the flange portion 85 of the housing 80.

As illustrated in FIGS. 2B and 3B, the seal portion 107 is inserted into the receiving hole 851 of the flange portion 85 and surrounds the terminal 60. At this time, ends of the protruding portions 93a and 93b contact with and support the side of the seal portion 107 opposite to the side in which the flange portion 85 of the housing 80 is arranged. Accordingly, in inserting the seal portion 107 into the receiving hole 851 of the flange portion 85 in the state where the rubber member 100 is attached to the cover 90 as described above, the deformation of the seal portion 107 is suppressed, which facilitates inserting the seal portion 107 into the receiving hole 851. That is, the protruding portions 93a and 93b support the seal portion 107 so as to restrict the deformation thereof. It is thus possible to maintain the seal portion 107 in a desired shape and to suppress the assembly workability from being degraded.

Further, as illustrated in FIG. 3B, the protruding portions 93a and 93b are in contact with the inner peripheral surface of the seal portion 103. Furthermore, the bent portion 63 of the terminal 60 is in contact with the inner peripheral surface of the seal portion 103. This suppresses deformation of the seal portion 103. Herein, the seal portion 107 is formed continuously from the seal portion 103 in the axial direction AD as described above. Therefore, the suppression of the deformation of the seal portion 103 suppresses the deformation of the seal portion 107. This suppresses assembly workability from being degraded. Thereby preventing the seal portion 103 from being deformed. This also suppresses deterioration of workability of assembly.

Further, the seal portion 103 surrounds a part of the terminal 60, the bent portion 63, and the through hole 92a of the cover 90. Furthermore, the seal portion 103 is compressed between the disk portion 91 of the cover 90 and the flange portion 85 of the housing 80 in the axial direction AD. This ensures waterproofness and dustproofness of the seal portion 103. Moreover, the transmission of vibrations between the cover 90 and the housing 80 due to the rotation of the rotor 40 is also suppressed. Thus, vibration-proofness is ensured.

As illustrated in FIG. 3B, the outer circumferential wall portion 105 is compressed between an inner peripheral edge surface 15 of the case 10 and the flange portion 85 of the housing 80 in the axial direction AD. This also ensures waterproofness and dustproofness. Furthermore, the transmission of vibrations between the case 10 and the housing 80 due to the rotation of the rotor 40 is also suppressed. Thus, vibration-proofness is ensured. Additionally, the inner peripheral edge surface 15 of the case 10 is a portion around the opening portion formed substantially in the center of the case 10. The rotational shaft 42 and the housing 80 pass through the opening portion.

In the above embodiment, the two protruding portions 93a and 93b are provided for one terminal 60, but the invention is not limited to this. At least one protruding portion has only to be provided. In addition, if the above-described use is satisfied, a member using a material having elasticity other than a rubber may be used instead of the rubber member 100.

While the exemplary embodiments of the present invention have been illustrated in detail, the present invention is not limited to the above-mentioned embodiments, and other embodiments, variations and modifications may be made without departing from the scope of the present invention.

What is claimed is:

1. A blower device comprising:
a fan;
a motor rotating the fan;
a cover covering a stator and a coil of the motor, the cover including a protruding portion;
a terminal electrically connected to the coil and protruding from the cover, the terminal including a bent portion in which the terminal is partially bent;
a printed circuit board electrically connected to the terminal;
a housing including a receiving hole receiving the terminal and supporting the stator; and
an elastic body sandwiched between the cover and the housing and formed into an annular shape, the elastic body including: (i) a first seal portion surrounding the terminal within the receiving hole, and (ii) a second seal portion surrounding the terminal and the protruding portion in a state where the elastic body is compressed between the cover and the housing, wherein:
a protruding height of the protruding portion of the cover is lower than a height of the terminal that protrudes from the cover,
the protruding portion supports the first seal portion,
the first and second seal portions are arranged in a direction in which the terminal extends, and
the bent portion of the terminal is electrically connected to the coil and is surrounded by the second seal portion.

2. The blower device of claim 1, wherein
a width of the terminal is greater than a thickness of the terminal, and
the protruding portion includes first and second protruding portions positioned to sandwich the terminal in a width direction of the terminal.

\* \* \* \* \*